(12) United States Patent
Alla (10) Patent No.: US 11,148,717 B2
(45) Date of Patent: Oct. 19, 2021

(54) FASTENING ELEMENT (71) Applicant: Volvo Truck Corporation, Gothenburg (SE)

(72) Inventor: Anantha Rama Krishna Lakshmi Narayana Alla, Bangalore (IN)

(73) Assignee: Volvo Truck Corporation, Gothenburg (SE)

(*) Notice: Subject to any disclaimer, the term of this patent is extended or adjusted under 35 U.S.C. 154(b) by 162 days.

(21) Appl. No.: 16/480,323

(22) PCT Filed: Jan. 10, 2018

(86) PCT No.: PCT/EP2018/050499
§ 371 (c)(1),
(2) Date: Jul. 24, 2019

(87) PCT Pub. No.: WO2018/141513
PCT Pub. Date: Aug. 9, 2018

(65) Prior Publication Data
US 2019/0382050 A1 Dec. 19, 2019

(30) Foreign Application Priority Data
Jan. 31, 2017 (IN) .............................. 201741003582

(51) Int. Cl.
*B62D 21/02* (2006.01)
*B62D 21/12* (2006.01)
(Continued)

(52) U.S. Cl.
CPC ............. *B62D 21/02* (2013.01); *B62D 21/12* (2013.01); *B60G 2204/143* (2013.01);
(Continued)

(58) Field of Classification Search
CPC . B62D 21/12; B62D 21/02; F16B 7/18; F16B 7/185; F16B 5/0614
See application file for complete search history.

(56) References Cited

U.S. PATENT DOCUMENTS 3,292,323 A 12/1966 Hagan
10,840,488 B2 * 11/2020 Izumi .................... H01M 50/20
(Continued)

FOREIGN PATENT DOCUMENTS

CN 203570814 U 4/2014
CN 101888946 A 1/2016
(Continued)

OTHER PUBLICATIONS

Machine language translation of DE 202004014808U1, obtained from Espacenet.com on Mar. 4, 2021.*
(Continued)

*Primary Examiner* — Paul N Dickson
*Assistant Examiner* — Mary E Young
(74) *Attorney, Agent, or Firm* — Withrow & Terranova, PLLC (57) ABSTRACT

The invention relates to a fastening element (100) for fastening a first component (6) to a second component (4). The fastening element (100) comprises a body (102), which comprises a first engagement portion (104) on a first side (106), wherein the first engagement portion (104) comprises either a recess or a projection for mating with a complimentary shaped engagement portion of the first component. The body (102) further comprises a first set of through holes (110) for receipt of fasteners, wherein the first set of through holes are positioned in such a way that the first engagement portion (104) of the body and the complimentary shaped engagement portion of the first component may be held against each other in an engaged state via the fasteners.

15 Claims, 11 Drawing Sheets

(51) Int. Cl.
*F16B 5/06* (2006.01)
*F16B 7/18* (2006.01)

(52) U.S. Cl.
CPC ............... *B60G 2204/4302* (2013.01); *B60G 2206/604* (2013.01); *F16B 5/0614* (2013.01); *F16B 7/18* (2013.01)

(56) References Cited

U.S. PATENT DOCUMENTS

| | | | |
|---|---|---|---|
| 2006/0170205 A1 | 8/2006 | Ramsey et al. | |
| 2007/0216147 A1 | 9/2007 | Ramsey | |
| 2013/0001384 A1* | 1/2013 | Karlsson | B60K 15/067 248/214 |
| 2015/0316203 A1* | 11/2015 | Zhang | F16B 7/187 248/65 |
| 2016/0121929 A1 | 5/2016 | Levin et al. | |

FOREIGN PATENT DOCUMENTS

| | | | |
|---|---|---|---|
| CN | 105283376 A | 1/2016 | |
| DE | 2314866 A1 | 2/1974 | |
| DE | 10040018 A1 * | 3/2001 | ........... B62D 33/077 |
| DE | 202004014808 U1 | 11/2004 | |
| DE | 102006051390 A1 | 4/2008 | |
| DE | 102011012435 A1 | 8/2012 | |
| EP | 3069925 A1 * | 9/2016 | ................ B60P 1/28 |
| WO | WO-9808727 A1 * | 3/1998 | ............. B62D 21/12 |
| WO | 2016/089316 A1 | 6/2016 | |

OTHER PUBLICATIONS

International Search Report and Written Opinion for International Patent Application No. PCT/EP2018/050499, dated Apr. 20, 2018, 12 pages.
Search Report for CN2018800094471.1 dated May 25, 2020, 2 pages.
Office Action for CN201880009447.1 dated Jun. 2, 2020, 15 pages.

* cited by examiner

FASTENING ELEMENT

This application is a 35 USC 371 national phase filing of international application no. PCT/EP2018/050499, filed Jan. 10, 2018, which claims priority to Indian patent application no. 201741003582, filed Jan. 31, 2017, the disclosures of which are incorporated herein by reference in their entireties.

TECHNICAL FIELD

The invention relates to a fastening element for fastening a first component to a second component. The fastening element may be used for fastening a component to a vehicle chassis component.

A typical chassis for a truck comprises two elongated and parallel frame side members of U-profile. Components, such as containers for fuel and other fluids, batteries, exhaust after treatment devices etc may be fastened to the frame side members via such fastening elements possibly via brackets. Further, the truck chassis comprises a plurality of frame cross members connecting the frame side members, wherein the frame cross members are arranged spaced in a longitudinal direction of the frame side members. Such a frame cross member may be fastened to the frame side member via such fastening elements. Further, such a fastening element may be used for fastening components, possibly via brackets, to such a frame cross member.

The invention can be applied in heavy-duty vehicles, such as trucks, buses and construction equipment such as working machines in the form of wheel loaders, articulated haulers, excavators and backhoe loaders. Although the invention will be described with respect to a truck, the invention is not restricted to this particular vehicle, but may also be used in other vehicles/machines as mentioned above and also in other applications such as passenger cars.

SUMMARY

An object of the invention is to provide a fastening element, which creates conditions for a low weight robust connection of two components, especially in an application where the connection is subjected to vibration and/or high loads, such as in a vehicle/machine.

The object is achieved by a fastening element according to claim 1. Thus, the object is achieved via a fastening element for fastening a first component to a second component, wherein the fastening element comprises a body, which comprises a first engagement portion on a first side, wherein the first engagement portion comprises either a recess or a projection for mating with a complimentary shaped engagement portion of the first component, wherein the body further comprises a first set of through holes for receipt of fasteners, wherein the first set of through holes are positioned in such a way that the first engagement portion of the body and the complimentary shaped engagement portion of the first component may be held against each other in an engaged state via the fasteners.

More specifically, the first engagement portion of the body and the complimentary shaped engagement portion of the first component may be adapted to form a form fit. Tightening of the fasteners after arranging the engagement portions in engagement establish the form fit connection, wherein the engagement portions are pushed or forced into an engagement state, in which the body and the first component are locked to each other, during the tightening. The fasteners may for example be formed by bolts/screws or rivets.

This design creates conditions for reduced stresses in a region of the first component (such as in an associated bracket) adjacent the fastening element, which in turn creates conditions for a longer life of the arrangement.

Further, the specific type of engagement via complimentary shaped recesses and projections creates conditions for utilizing friction in the engagement, which creates conditions for a reduced size of the fastening element and/or a reduced number of fasteners like rivets and bolts. Further, a small size, and more specifically a small thickness, of the fastening element creates conditions for a low production cost.

Further, this design creates conditions for a time-efficient assembly operation in that the first component/bracket is connected to the fastening element via said fasteners and possibly only via said fasteners.

The first set of through holes may be positioned in parallel with an engagement direction of the first engagement portion for engagement with the complimentary shaped engagement portion of the first component.

More specifically, the first set of through holes are positioned in such a way that the body and the first component are moved relative to one another in a direction towards an engaged state during tightening of the fasteners, wherein the facing engagement surfaces of the body and the first component are moved into a rigid connection during the tightening.

More specifically, each one of the holes in the first set of through holes preferably has an extension in parallel with a depth/height direction of the recess/process.

According to one embodiment, the first engagement portion has an elongated shape. Preferably, the first engagement portion has a straight extension. More specifically, each one of the holes in the first set of through holes preferably has an extension perpendicularly in relation to a longitudinal direction of the recess/process.

This design creates conditions for fastening components of considerable dimensions and weights in a secure way. Especially, the complimentary shaped engagement portion of the first component may be designed with an elongated shape (and size) forming at least a substantial overlap with the first engagement portion and preferably being of substantially same length as the length of the first engagement portion of the fastening element.

According to a further embodiment, the first engagement portion has the same cross sectional shape (and size) in spaced positions along a longitudinal direction of the first engagement portion. More specifically, the first engagement portion may have a uniform cross section shape (and size) in the longitudinal direction. This design creates conditions for a reduced weight of the fastening element in relation to existing solutions.

According to a further embodiment, the first engagement portion extends the complete distance between opposite ends of the body. This design creates conditions for a cost-effective production of the fastening element, such as via extrusion followed by machining the through holes. This design creates further conditions for a cost-effective production in that extrusion cost is relatively low and final machining cost is relatively low. Further, the fastening element may be produced in any length in an easy way.

According to a further embodiment, the first engagement portion comprises a recess. Accordingly, the complimentary shaped engagement portion of the first component comprises a projection. This design creates conditions for receiving a first end of the fastener in a secure way. More specifically, in the case of the fastener forming a bolt, this design creates conditions for receiving a bolt head or corresponding nut in a secure way.

According to a further embodiment, the first engagement portion comprises a flat surface. The through holes are preferably provided through the flat surface, wherein by proper dimensioning, there may be space for corresponding fasteners to be tightened in a proper way. Preferably in the case that the first engagement portion is elongated, the flat surface is also elongated and extends in parallel with a longitudinal direction of the first engagement portion. Preferably, the flat surface extends over a complete extension of the first engagement portion.

According to a further embodiment, the first set of through holes extends between the first side of the body and a second side of the body opposite the first side. This design creates conditions for a secure fastening of the first component to the fastening element.

According to a further embodiment, at least one through hole of the first set of through holes extend through the first engagement portion on the first side of the body. Preferably the through holes extend through the flat surface forming a bottom of the recess (or top of the projection), wherein by arranging the through holes through the flat surface, the fasteners may be securely tightened. To avoid loosening issues in some applications fasteners may need to be tightened with a high torque. An extension of the flat surface transverse to its longitudinal direction should be sufficient for access for tightening of the fasteners.

According to a further embodiment, the holes in the first set of through holes are arranged in parallel with each other and spaced from each other in a first direction. More specifically, the holes in the first set of through holes may be arranged in a spaced relationship along a straight line. In the case of an elongated shape of the first engagement portion/recess, first direction of the holes may be in parallel with the longitudinal direction of the first engagement portion/recess.

According to a further embodiment, the body comprises a second engagement portion on a second side opposite the first side, wherein the second engagement portion comprises either a recess or a projection. This design creates conditions for receiving a second end of the fastener in a secure way. More specifically, in the case of the fastener forming a bolt, this design creates conditions for receiving a bolt head or corresponding nut in a secure way.

Further, the second engagement portion on the second side of the body may be designed for engagement with a complimentary shaped engagement portion of the second component, preferably via form fit.

This design with both a first and a second engagement portion creates conditions for using a single chassis interface for mounting several chassis components.

Further, the second engagement portion on the second side of the body may have a shape and dimension similar to or exactly the same as the first engagement portion on the first side of the body. In other words, the body may be symmetrical with regard to a center plane between the first side and the second side of the body. Thus, the second engagement portion may have an elongated shape and preferably a straight extension. Further, the second engagement portion may have the same cross sectional shape in spaced positions along a longitudinal direction of the second engagement portion. Further, the second engagement portion may have the same cross sectional shape as the first engagement portion. Further, the second engagement portion may extend the complete distance between opposite ends of the body. Further, the second engagement portion extends in parallel with the first engagement portion. In other words, a longitudinal direction of the second engagement portion extends in parallel with a longitudinal direction of the first engagement portion. Further, the second engagement portion may comprise a recess.

According to a further embodiment, the fastening element comprises a second set of through holes for receipt of fasteners for fastening the fastening element to the second component. The through holes of the second set may be arranged spaced from the through holes of the first set. Preferably each one of the first set and the second set comprises a plurality of through holes arranged in a row and every second hole is from the first set. According to one example, the second set of through holes extends between a third side and a fourth side of the body. Further, according to a further variant, at least one of the third side and the fourth side of the body comprises a planar surface. Arranging the holes through the planar surface and preferably with an extension perpendicularly in relation to the planar surface creates conditions for tightening the corresponding fasteners in a secure way.

Further, this design creates conditions for a facilitated assembly of components also in difficult positions, such as on both sides of a frame side member.

According to a further embodiment, an extension direction of at least one hole of the second set of through holes differs from an extension direction of at least one hole of the first set of through holes. According to one example, an extension direction of at least one hole of the second set of through holes is perpendicular in relation to at least one hole of the first set of through holes. According to one example, the holes in the second set of through holes are arranged in parallel with each other and spaced in a second direction.

According to a further embodiment, the body has an elongated shape. According to one example, the elongated first engagement means extends in parallel with a longitudinal direction of the elongated body. This design creates conditions for a cost-effective production, such as by extrusion followed by machining the through holes. Thus, according to a further embodiment, the body has the same exterior cross sectional shape in spaced positions along a longitudinal direction of the body. According to one example, the body is formed by extrusion followed by machining the holes. According to a further example, the elongated second engagement means extends in parallel with the longitudinal direction of the elongated body.

According to a further embodiment, the body is formed in aluminium or an aluminium alloy. This design creates conditions for a light-weight fastener element and it creates conditions for being formed via extrusion. Further, aluminium has a wide strength range, a high strength to weight ratio, is not susceptible to corrosion with a simple and effective anodizing process, no extra surface treatment is needed, it reduces weight on total installation and friction characteristics are good.

According to a further embodiment, the second component is a vehicle chassis component. Such a chassis component may in turn be formed by an elongated frame side member or a cross member in a truck.

According to a further aspect of the invention, it regards a chassis arrangement for a vehicle, wherein the chassis arrangement comprises a first vehicle chassis component, a second vehicle chassis component and and a fastening element according to any one of the preceding embodiments, examples and variants, wherein the first vehicle chassis component is fastened to the second vehicle chassis component via the fastening element. According to one example, the chassis arrangement comprises two elongated and parallel frame side members, wherein the second vehicle chassis component is formed by one of said elongated frame side members.

According to a further aspect of the invention, it regards a vehicle comprising a chassis arrangement according to above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
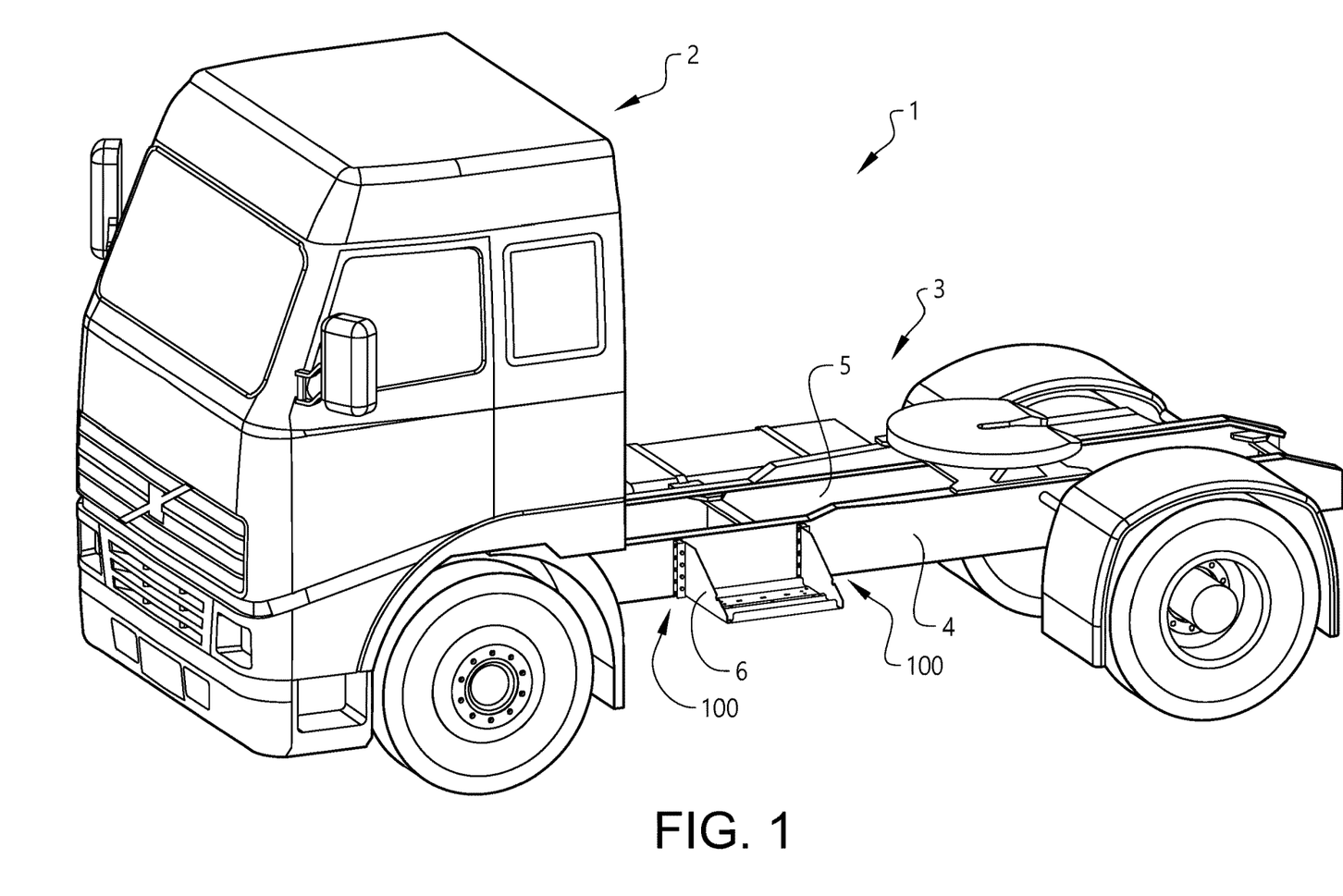
FIG. 1 shows a truck in a perspective front view, wherein the truck comprises a chassis arrangement according to a first embodiment, which in turn comprises a fastening element according to a first embodiment.

FIG. 1 shows a vehicle in the form of a truck 1 in a perspective front view. The truck 1 comprises a cab 2 and a chassis arrangement 3 according to a first embodiment. The chassis arrangement 3 comprises two elongated and parallel frame side members 4, 5. Each one of the frame side members 4, 5 has a U-shaped cross sectional shape. Further, the two frame side members 4, 5 are arranged so that an open side of the "U"s face each other. A pair of identical fastening elements 100 according to a first embodiment is arranged for fastening a first vehicle component 6 in the form of a bracket structure for a battery box to a second vehicle component, which is here exemplified by one of the frame side members 4.

Figures 2A, 2B:
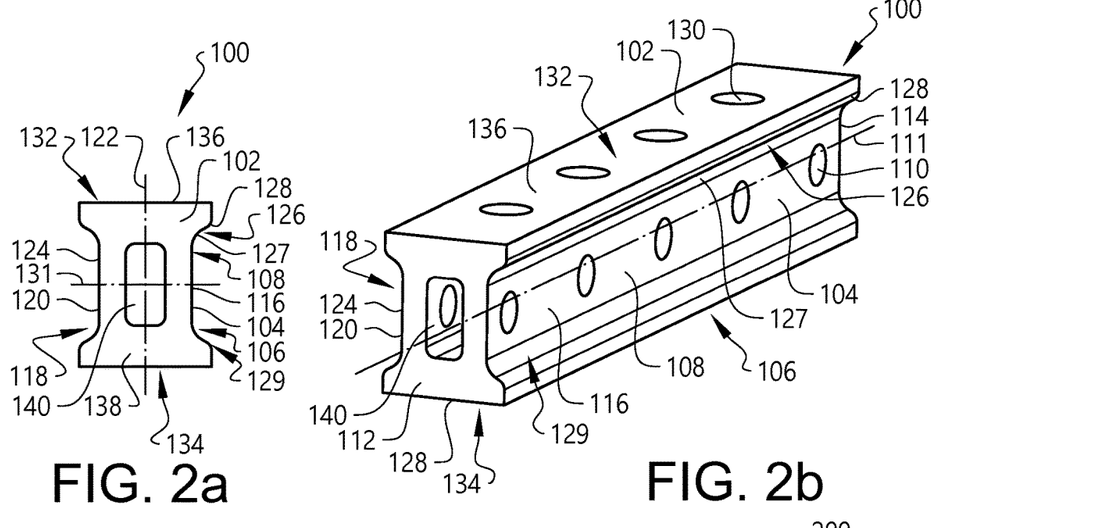
FIGS. 2a and 2b show the fastening element according to the first embodiment in FIG. 1 in a perspective view and a side view, respectively.

FIGS. 2a and 2b shows one of the fastening elements 100 according to the first embodiment in a perspective view and a side view, respectively. The fastening element 100 comprises a body 102, which comprises a first engagement portion 104 on a first side 106. The first engagement portion 104 comprises an abutment surface. Further, the first engagement portion 104 comprises a recess 108 for mating with a complimentary shaped engagement portion (projection) of the first component 6. Thus, the complimentary shaped engagement portion (projection) of the first component 6 comprises an abutment surface. Further, the body 102 further comprises a first set of through holes 110 adapted for receipt of fasteners (not shown), wherein the first set of through holes 110 are positioned in such a way that the first engagement portion 104 of the body 102 and the complimentary shaped engagement portion of the first component 6 may be held against each other in an engaged state via the fasteners. More specifically, at least one through hole of the first set of through holes 110 extends through the first engagement portion 104 on the first side 106 of the body.

In other words, the fastening element 100 is adapted for a form fit relative to the first component 6. Further, the position and direction of the holes 110 and provision of the associated fasteners are arranged for establishing the form fit, wherein the engagement portions are forced into engagement via application/tightening of the fasteners. More specifically, the first set of through holes 110 are positioned in parallel with an engagement direction of the first engagement portion 104 for engagement with the complimentary shaped engagement portion of the first component. The fasteners may be of a type, which is adapted for a gradual engagement via tightening, wherein the fasteners may have an external threading, such as screws, wherein the engagement portions are pushed relative to one another towards the engagement state. Accordingly, also the through holes may be provided with a complimentary shaped threading for engagement.

The first engagement portion 104 has an elongated shape. More specifically, the first engagement portion 104 has a straight extension direction. Further, the first engagement portion 104 has the same cross sectional shape in spaced positions along a longitudinal direction 111 of the first engagement portion. More specifically, the first engagement portion 104 has the same shape (and size) along its entire extension in its longitudinal direction. More specifically, the first engagement portion 104 extends the complete distance between opposite ends 112, 114 of the body 102.

Further, the first engagement portion 104 comprises a flat surface 116, which is elongated and extends in parallel with the longitudinal direction of the first engagement portion 104. The flat surface 116 forms a center section of the first engagement portion 104 and in this case a bottom in the recess. Further, the first engagement portion 104 comprises an elongated transition region 126 at one side of the first engagement portion 104, wherein the elongated transition region 126 comprises a first surface with a concave, rounded shape adjacent the flat surface 126 and a second surface with a convex, rounded shape adjacent the first, concave surface and on an opposite side in relation to the flat surface. The second surface with a convex, rounded shape has a smaller radius than a radius of the first surface with the concave, rounded shape. Further, the first engagement portion 104 comprises a further elongated transition region 129 at an opposite side of the first engagement portion 104, wherein the further elongated transition region 129 has a similar shape as the transition region 126. More specifically, the first engagement portion 104 has a symmetrical shape with regard to a second symmetry plane 131 of the body 102, which is perpendicular to a first symmetry plane 122 of the body 102.

Further, the first set of through holes 110 extend between the first side 106 of the body 102 and a second side 118 of the body 102 opposite the first side. Further, the first set of through holes 110 are provided through the flat surface and perpendicularly in relation to an extension plane of the flat surface, wherein the fasteners may be securely connected and disconnected. To avoid loosening issues, it may be required that the fasteners are tightened with high torque.

The holes in the first set of through holes 110 are arranged in parallel with each other and spaced from each other in a first direction, wherein the first direction is in parallel with the longitudinal direction 111 of the first engagement portion 104.

The body 102 comprises a second engagement portion 120 on the second side 118, wherein the second engagement portion 120 comprises a recess. The second engagement portion 120 has an elongated shape. More specifically, the second engagement portion 120 has a straight extension direction. Further, the second engagement portion 120 has the same cross sectional shape in spaced positions along a longitudinal direction 111 of the second engagement portion. More specifically, the second engagement portion 120 has the same shape along its entire extension in its longitudinal direction. More specifically, the second engagement portion 120 extends the complete distance between the opposite ends 112, 114 of the body 102. More specifically, the longitudinal direction of the second engagement portion 120 is in parallel with the longitudinal direction of the first engagement portion 104. More specifically, the second engagement portion 120 has the same cross sectional shape and dimension as the first engagement portion 104. The body 102 has a symmetrical shape with regard to a center plane 122 between the first side 106 and the second side 118.

The holes in the first set of through holes 110 extends through the second engagement portion 120 and more specifically through a flat bottom surface 124 of the second engagement portion 120. The planar surface 116 of the first side 106 extends in a plane in parallel with an extension plane of the planar surface 124 of the second side 118. The second engagement portion 120 is adapted for receipt of an end part of the fastener, such as a screw head or nut. Further, the second engagement portion 120 is designed for achieving a form fit for mating with a complimentary shaped engagement portion of another component.

Further, the fastening element 100 comprises a second set of through holes 130 for receipt of fasteners for fastening the fastening element 100 to the second component 4 (one of the side frame members). The second set of through holes 130 extend between a third side 132 and a fourth side 134 opposite the third side 132 of the body 102. Further, the second set of through holes 130 comprises a plurality of spaced holes 130 arranged in parallel with each other. Further, the holes 130 are spaced along a straight line, which is in parallel with a longitudinal direction 111 of the body 102. Each one of the third side 132 and the fourth side 134 of the body 102 comprises a planar surface 136, 138 and the holes 130 extend through the planar surfaces 136, 138. The planar surface 136 of the third side 132 extend in a plane in parallel with an extension plane of the planar surface 138 of the fourth side 134. The planar surfaces 136, 138 of the third and fourth side 132, 134 of the body 102 are arranged perpendicular in relation to the planar surfaces 116,124 of the first and second engagement portions 104,118. Further, the second set of through holes 130 extends perpendicular in relation to the first set of through holes 110.

Thus, the body 102 has an elongated shape with a longitudinal direction 111. A longitudinal direction of each one of the first and second engagement portions 106,118 extends in parallel with the longitudinal direction of the elongated body 102. The elongated body 102 has a symmetrical shape with regard to each one of the first and second symmetry planes 122,131. Further, the elongated body 102 has the same exterior cross sectional shape in spaced positions along a longitudinal direction of the body. More specifically, the elongated body 102 has a uniform cross sectional shape along its longitudinal direction 111, which creates conditions for being formed by extrusion (followed by machining the holes). Further, the body 102 may be formed in aluminium or an aluminium alloy. Further, the elongated body 102 has an internal chamber 140 for weight saving, which extends in parallel with the longitudinal direction 111 of the body 102.

Figure 2C:
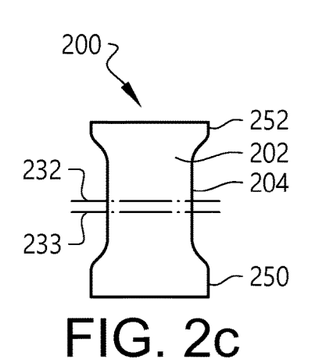
FIGS. 2c and 2d show a fastening element according to a second embodiment in a perspective view and a side view, respectively.
Figure 2D:
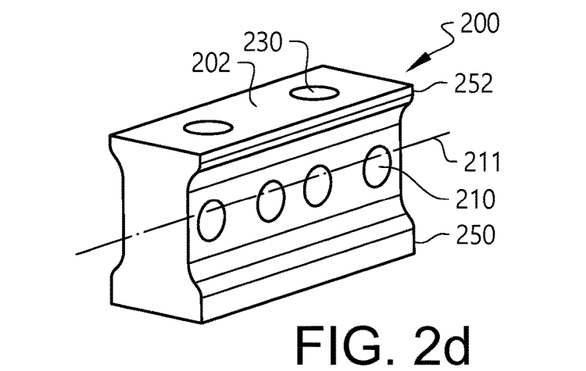

FIGS. 2c and 2d show the fastening element 200 according to a second embodiment in a perspective view and a side view, respectively. For ease of presentation, only the main differences in relation to the first embodiment will be described. The fastening element 200 according to the second embodiment has a shorter length in its longitudinal direction 211 in relation to the fastening element 100 according to the first embodiment. Further, the number of through holes in the first set of holes 210 and in the second set of holes 230, respectively, is reduced corresponding to the shorter length. Further, the body 202 is devoid of any elongated internal chamber. In other words, the body 202 is solid save for the first and second set of holes 210,230.

Further, a center plane 233 of the body 202 is offset in relation to a center plane 232 of the first engagement portion 204, wherein the body has a longer extension 250 on one side of the first engagement portion 204 than an extension 252 on the other side of the first engagement portion 204 perpendicular to the longitudinal direction of the first engagement portion 204.

Figure 2E:
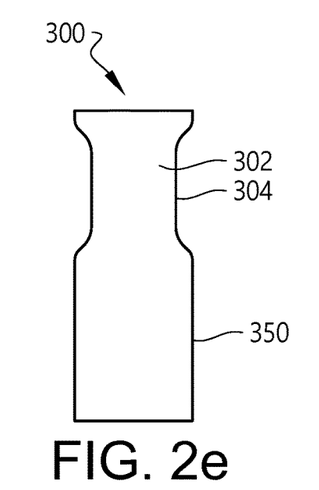
FIGS. 2e and 2f show a fastening element according to a third embodiment in a perspective view and a side view, respectively.
Figure 2F:
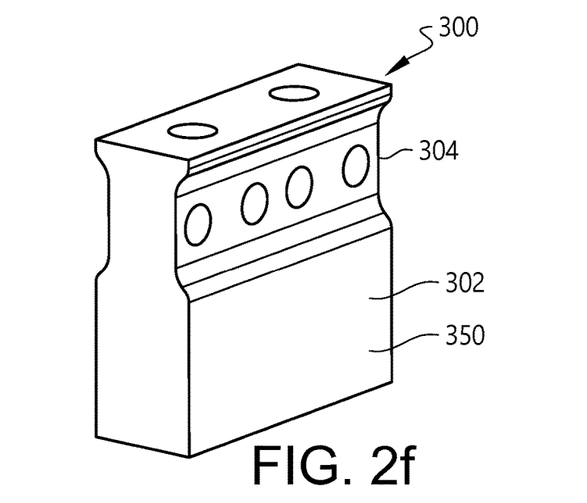

FIGS. 2e and 2f show the fastening element 300 according to a third embodiment in a perspective view and a side view, respectively. For ease of presentation, only the main differences in relation to the second embodiment will be described. The body 302 has a longer extension 350 on said one side of the first engagement portion 304 than the extension 250 on said one side of the first engagement portion 204 according to the second embodiment perpendicular to the longitudinal direction of the first engagement portion. More specifically, the extension 350 is about 50% of the complete extension of the body 302 perpendicular to the longitudinal direction of the body.

Figure 2G:
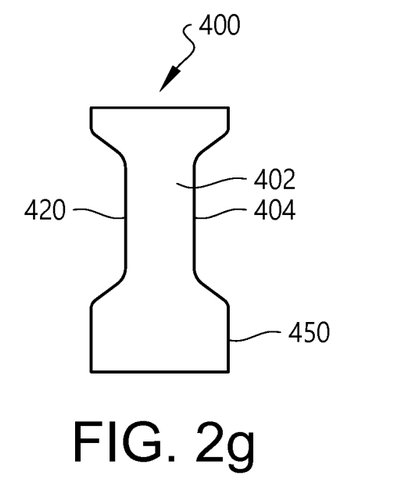
FIGS. 2g and 2h show a fastening element according to a fourth embodiment in a perspective view and a side view, respectively.
Figure 2H:
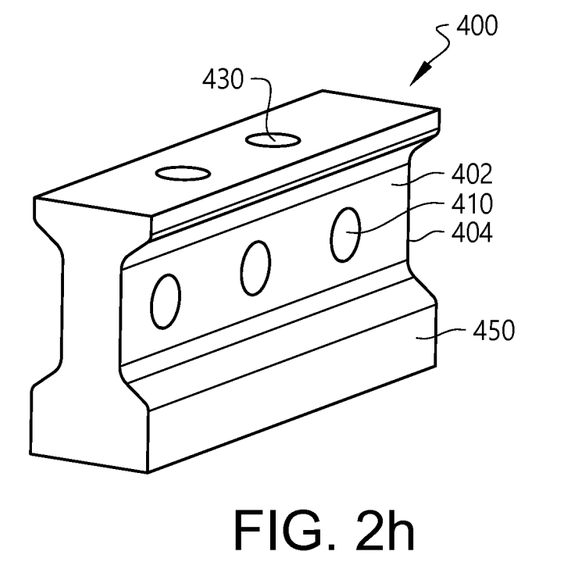

FIGS. 2g and 2h show the fastening element 400 according to a fourth embodiment in a perspective view and a side view, respectively. For ease of presentation, only the main differences in relation to the second embodiment will be described. The body 402 has a longer extension 450 on said one side of the first engagement portion 404 than the extension 250 on said one side of the first engagement portion 204 according to the second embodiment perpendicular to the longitudinal direction of the first engagement portion. Further, a thickness of the body 402 between an innermost surface of the recessed first and second engagement portions 404, 420 is relatively smaller in the fourth embodiment in relation to the second embodiment. Further, the number of holes in the first set of through holes 410 is reduced from four to three in the fourth embodiment in relation to the second embodiment.

Figure 2I:
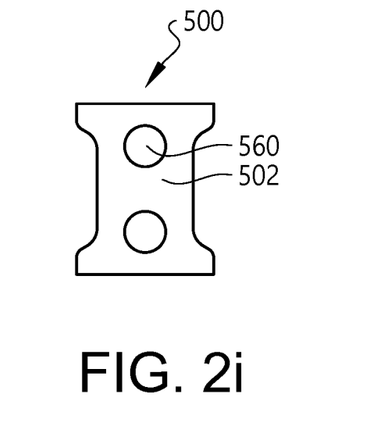
FIGS. 2i and 2j show a fastening element according to a fifth embodiment in a perspective view and a side view, respectively.
Figure 2J:
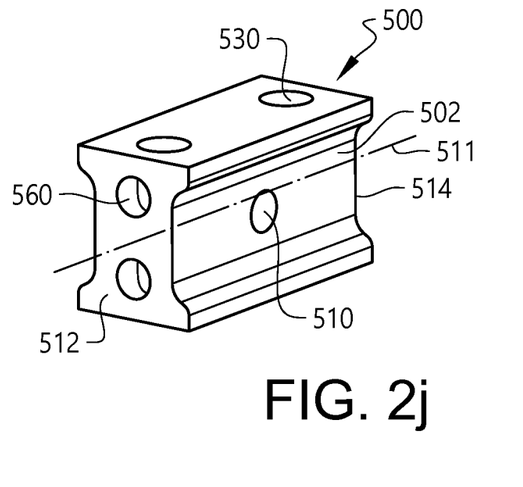

FIGS. 2i and 2j show the fastening element 500 according to a fifth embodiment in a perspective view and a side view, respectively. For ease of presentation, only the main differences in relation to the first embodiment will be described. The fastening element 500 according to the fifth embodiment has a shorter length in its longitudinal direction 511 in relation to the fastening element 100 according to the first embodiment. Further, the number of through holes in the first set of holes 510 and in the second set of holes 530, respectively, is reduced corresponding to the shorter length. Further, the body 502 comprises a third set of through holes 560 adapted for receipt of fasteners or other form of matching projections, such as locating pins. The through holes 560 extend in parallel with the longitudinal direction 511 of the body 502 between opposite ends 512,514 of the body.

Figure 3A:
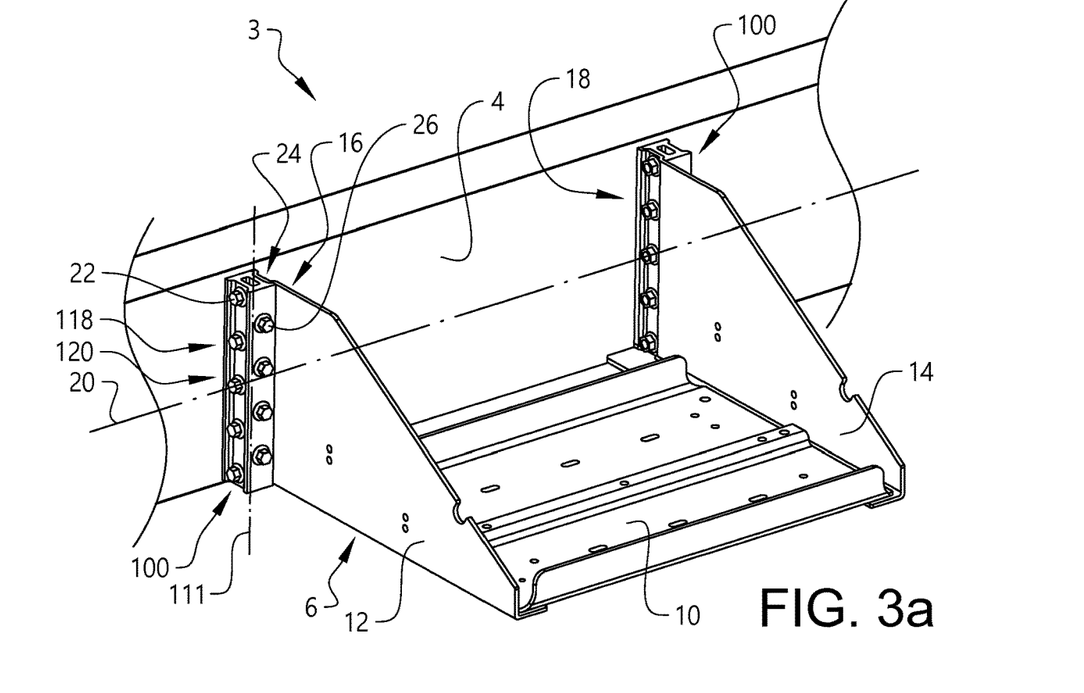
FIG. 3a shows the chassis arrangement according to FIG. 1 in an enlarged view.

FIG. 3a shows the chassis arrangement 3 according to FIG. 1 in an enlarged view. The chassis arrangement 3 comprises the frame side member 4. A pair of fastening elements 100 is arranged for fastening the bracket structure 6 to the frame side member 4. The bracket structure 6 comprises a means 10 for supporting the battery box. The supporting means 10 is formed by a plate shaped member. The bracket structure 6 further comprises two side walls 12,14, one on each side of the support means 10. The bracket structure 6 may be formed by a sheet metal. The side walls 12,14, extend in a plane perpendicular to an extension plane of the plate shaped member 10. One elongated, straight edge 16, 18 of each one of the side walls 12, 14 is connected to the frame side member 4 via the pair of fastening elements 100. Further, the frame side member 4 is elongated with a main extension 20. Each one of the fastening elements 100 is arranged so that its longitudinal direction 111 extends perpendicularly to the extension direction 20 of the frame side member 4.

The chassis arrangement 3 comprises a first set of fasteners 22 arranged in the first set of through holes 110 for connecting a complimentary shaped engagement portion 24 of the side wall 12 to the first engagement portion 104 of the fastening element 100. More specifically, the side wall 12 has an end region, which is bent forming an elongated projection, which in turn forms the complimentary shaped engagement portion 24. The fasteners 22 are here formed by screws, wherein a nut 28 is associated to each screw, se FIG. 3b.

Further, the chassis arrangement 3 comprises a second set of fasteners 26 arranged in the second set of through holes 130 for connecting the fastening element 100 to the frame side member 4. The frame side member 4 is provided with a hole pattern 30 commensurate with the second set of through holes 130 for receipt of said fasteners 26.

Further, the second engagement portion 120 on the second side 118 of the fastening element 100 is accessible for attachment of a further component.

Figure 3B:
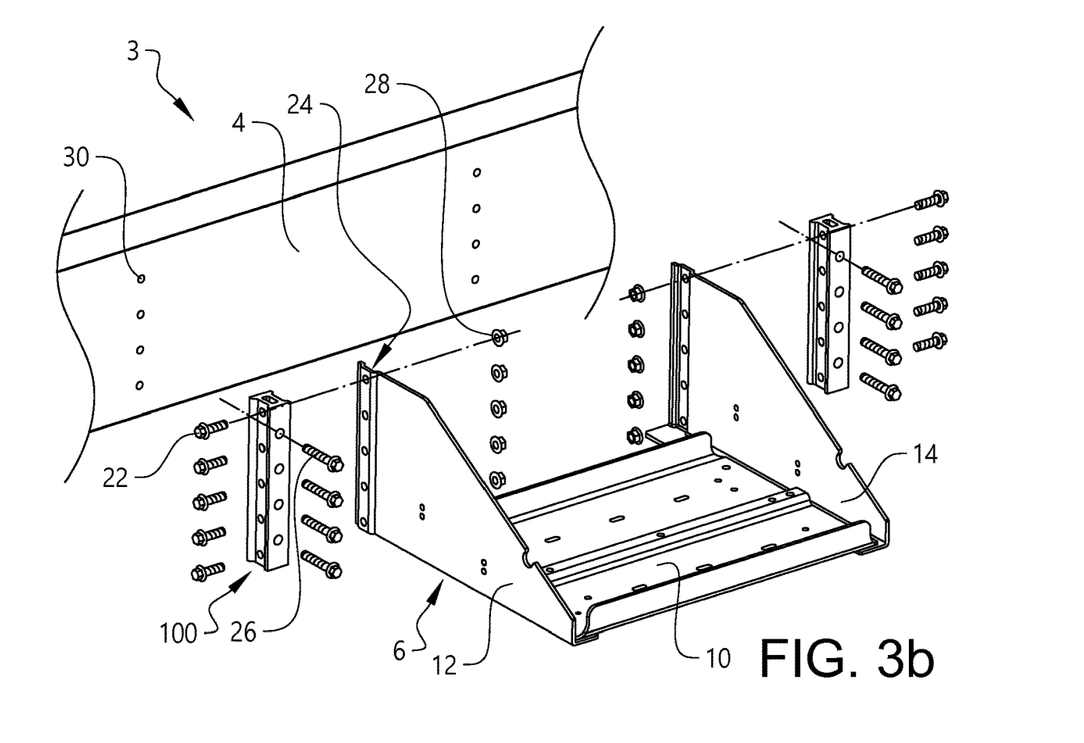
FIG. 3b shows the chassis arrangement according to FIG. 3a in an exploded view.

FIG. 3b shows the chassis arrangement according to FIG. 3a in an exploded view.

Figure 4:
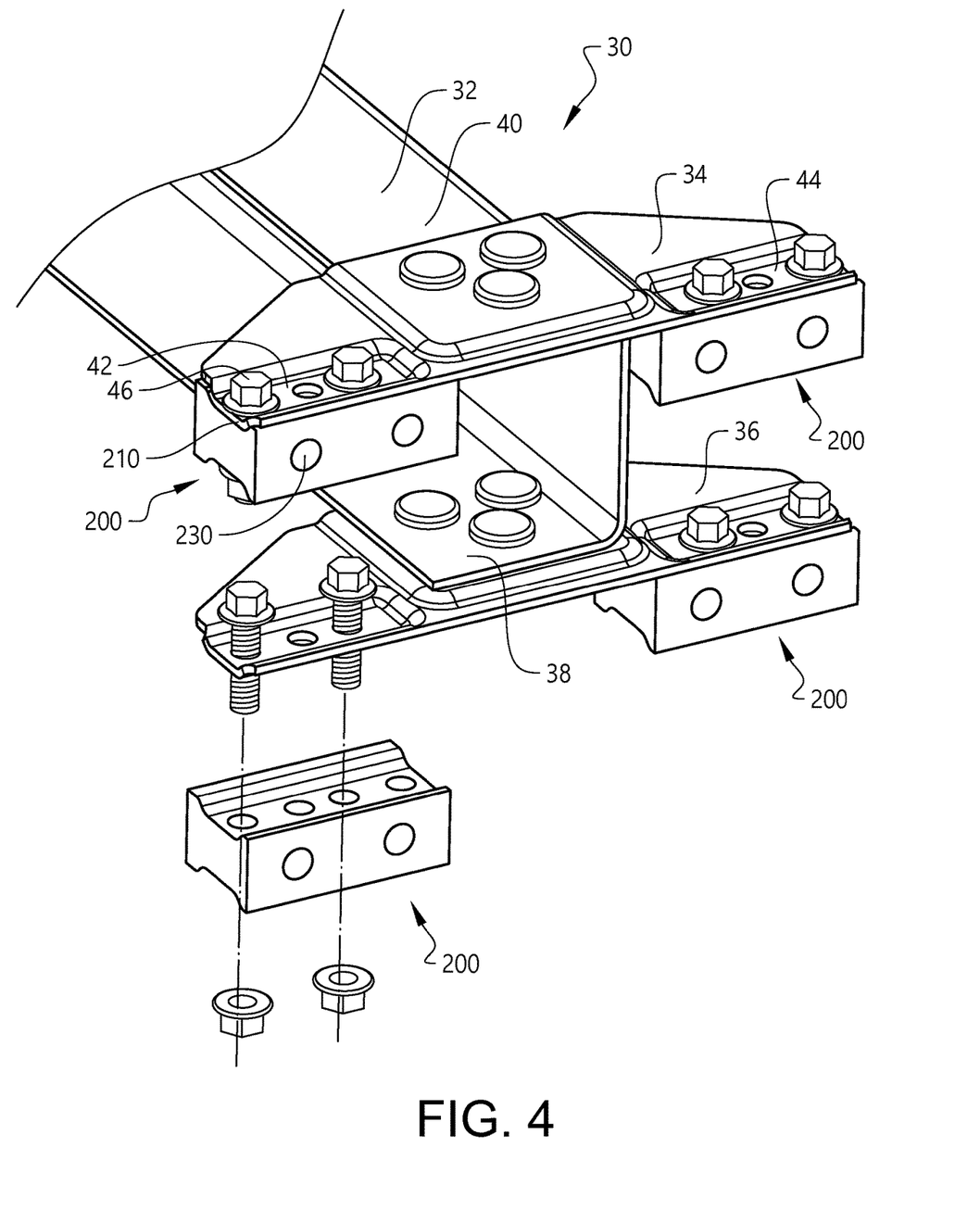
FIG. 4 shows a chassis arrangement according to a second embodiment in a perspective, partly exploded view.

FIG. 4 shows a chassis arrangement 30 according to a second embodiment in a perspective, partly exploded view. The chassis arrangement 30 comprises a frame cross member 32, which is adapted to be rigidly connected to one of the frame side members 4,5 via two brackets 34,36 and four fastening elements 200 according to the second embodiment shown in FIGS. 2c and 2d. More specifically, the frame cross member 32 comprises a lower elongated plate shaped part 38 and an upper elongated plate shaped part 40, which are arranged in parallel spaced relationship. A first of said brackets 34 is arranged on top of the upper plate shaped part 40 and rigidly connected to the same in a parallel relationship. Further, the bracket 34 comprises two engagement portions 42, 44, each of which is complimentary shaped in relation to a first engagement portion 104 of an associated fastening element 100. Further, the bracket 34 has a longer extension than the frame side member 4 in a transverse direction of the frame side member 4 so that the complimentary shaped engagement portions 42, 44 are accessible on each side of the frame side member 4. Further, each one of the complimentary shaped engagement portions 42, 44 has an elongated shape and they extend in parallel with each other. Further, each one of the complimentary shaped engagement portions 42, 44 forms a projection for engagement with the associated recessed first engagement portion 204 of the fastening element 200. Further, the bracket 34 is arranged in such a way relative to the cross member 32 that the complimentary shaped engagement portions 42, 44 extend perpendicularly in relation to a longitudinal direction of the cross member 32.

Further, each one of the complimentary shaped engagement portions 42, 44 comprises a hole pattern commensurate with the first set of through holes 210 so that the bracket 34 may be fastened to the fastening element 200 via a plurality of fasteners 46 in the first set of through holes 210 and the commensurate hole pattern in the complimentary shaped engagement portions 42, 44. Further, the second set of through holes 230 is accessible for fastening of the fastening element 200 to the frame side member via a further set of fasteners.

In a similar manner, a second of said brackets 36 is arranged below the lower plate shaped part 38 and rigidly connected to the same, wherein the second bracket 36 is adapted for a rigid connection of the frame cross member 32 to the associated frame side member via the fastening elements 200 in a similar way as has been describe above for the first bracket 34.

Figure 5:
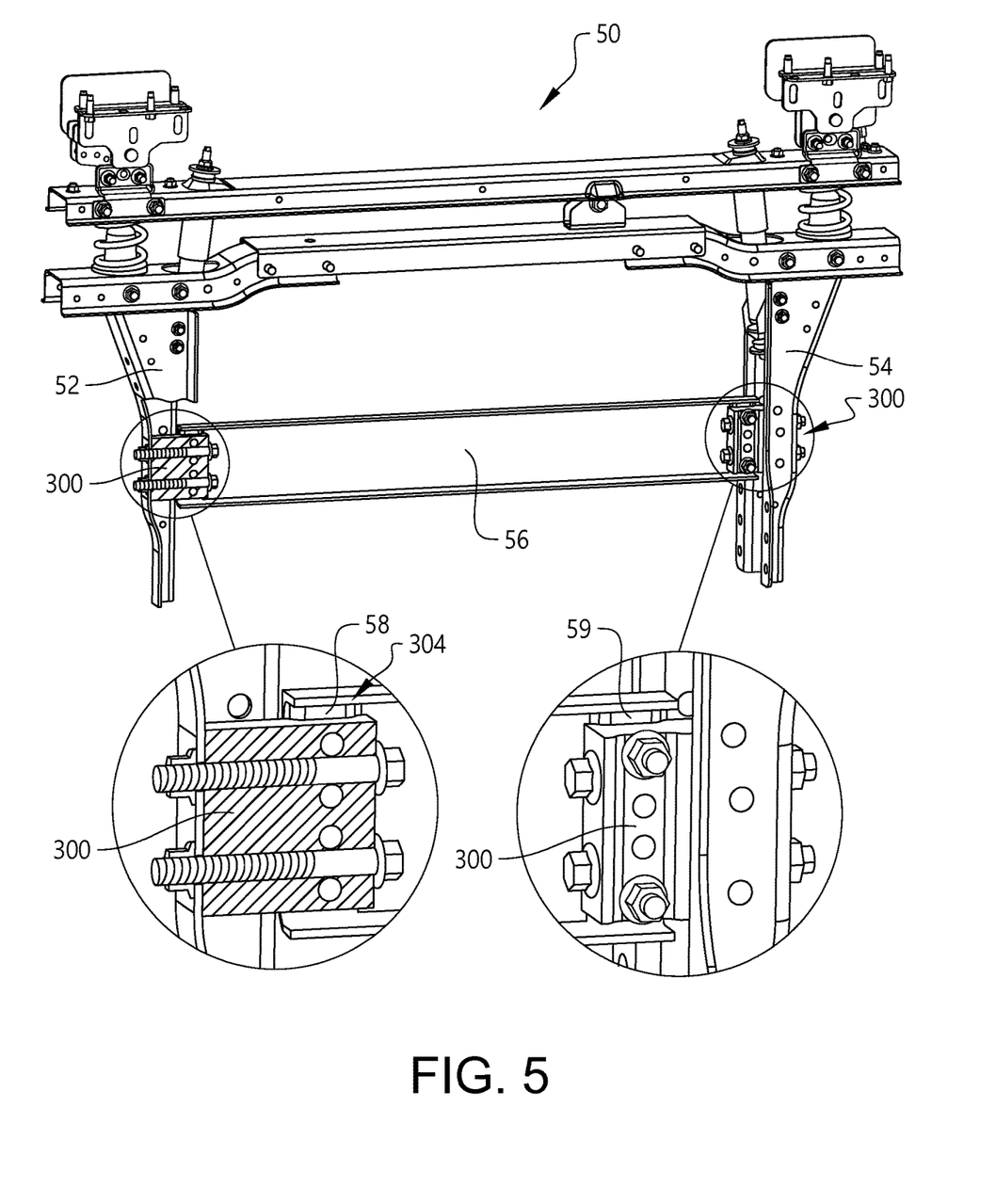
FIG. 5 shows a chassis arrangement according to a third embodiment in a perspective, partly cut view from above.

FIG. 5 shows a chassis arrangement 50 in the form of a cab suspension anchorage according to a third embodiment in a perspective view from above. The chassis arrangement 50 comprises a pair of vertical frame members 52, 54. Each one of the vertical frame members 52, 54 is adapted to be rigidly connected to one of said frame side members 4,5. Further, the chassis arrangement 50 comprises a cross member 56 bridging the distance between the vertical frame members 52, 54. Further, the chassis arrangement 50 comprises two fastening elements 300 according to the third embodiment. One of said fastening elements 300 is arranged to rigidly connect a first end of the cross member 56 to a first one of the vertical frame members 52 and a second one of said fastening elements 300 is arranged to rigidly connect a second end of the cross member 56 to a second one of the vertical frame members 54. Each end of the cross member 56 comprises an engagement portion 58,59 in the form of an elongated projection, which is complimentary shaped to the recessed first engagement portion 304 of the associated fastening element 300. More specifically, each one of the complimentary shaped engagement portions 58,59 is elongated and extends perpendicularly in relation to a main extension direction of the cross member 56. Further, each one of the complimentary shaped engagement portions 58,59 comprises a hole pattern commensurate with the first set of through holes in the fastening element 300. Further, each one of the vertical side members 52, 54 comprises a hole pattern commensurate with the second set of through holes in the fastening element 300.

In a similar manner as has been described above for the first and second embodiments, the fastening element 300 is rigidly connected to the cross member 56 via fasteners in the first set of through holes and the commensurate hole pattern in the cross member 56. Further, also in a similar manner as has been described above, the fastening element 300 is rigidly connected to the vertical side members 52, 54 via fasteners in the second set of through holes and the commensurate hole pattern in the vertical side members 52, 54.

Figure 6A:
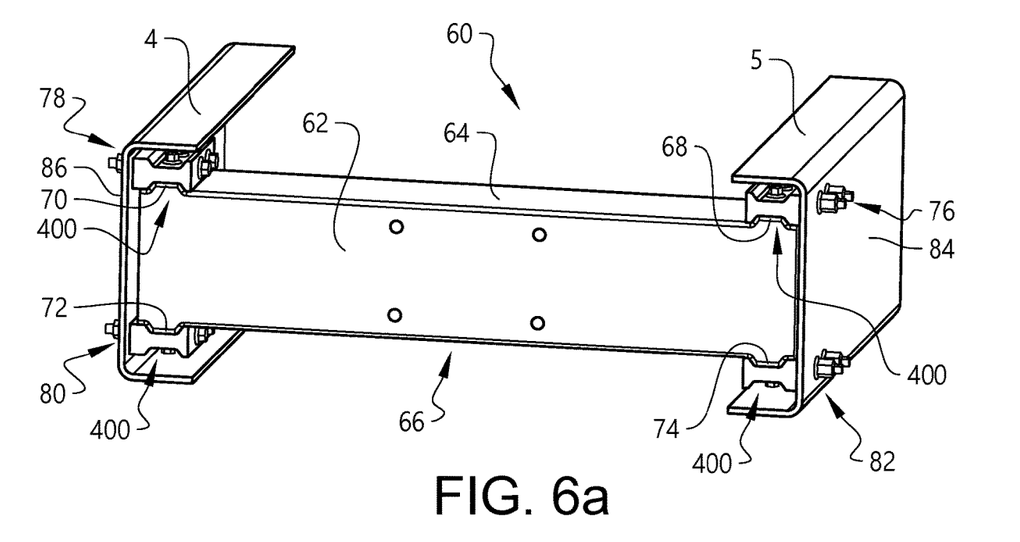
FIGS. 6a and 6b show a chassis arrangement according to a fourth embodiment in perspective views from opposite sides.
Figure 6B:
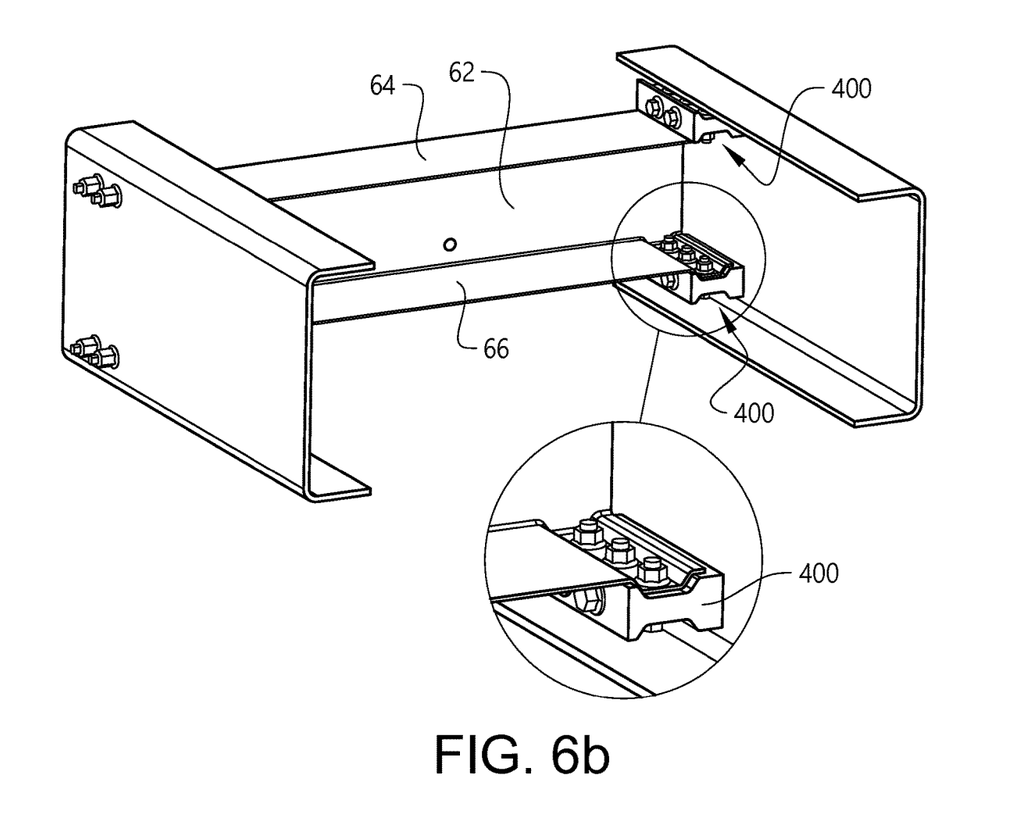

FIGS. 6a and 6b show a chassis arrangement 60 according to a fourth embodiment in perspective views from above from opposite sides. The chassis arrangement 60 comprises said two frame side members 4,5. Further, the chassis arrangement 50 comprises a cross member 62 bridging the distance between the frame side members 4,5. The cross member 62 has a U-shaped cross sectional shape. Further, the cross member 62 has sufficient length for being accommodated in the U-shaped frame side members 4,5 at each end. Further, the chassis arrangement 60 comprises two pairs of the fastening element 400 according to the fourth embodiment.

Further, the cross member 62 comprises an upper elongated plate-shaped member 64 and a lower elongated plate-shaped member 66, which are arranged in parallel with each other, in a spaced relationship and in parallel with a longitudinal direction of the cross member 62. Each end of the upper elongated plate-shaped member 64 comprises a complimentary shaped engagement portion 68, 70. Each one of the complimentary shaped engagement portion 68, 70 comprises an elongated projection with a longitudinal direction perpendicular to a longitudinal direction of the cross member 62. Both projections 68,70 faces upwards. In a similar manner, each end of the lower elongated plate-shaped member 66 comprises a complimentary shaped engagement portion 72,74. Each one of the complimentary shaped engagement portion 72,74 comprises an elongated projection with a longitudinal direction perpendicular to a longitudinal direction of the cross member 62. Both projections 72,74 faces downwards. Further, each one of the upper elongated plate-shaped member 64 and the lower elongated plate-shaped member 66 comprises a hole pattern in the complimentary shaped engagement portion 68,70,72,74 commensurate with the first set of through holes 410 of the associated fastening element 400.

Each one of the four fastening elements 400 is arranged so that the recessed engagement portion 404 is in engagement with an associated one of the four projections 68,70, 72,74 and fastened to the respective one of the elongated plate-shaped member 64,66 via fasteners.

Further, each one of the frame side members 4,5 comprises a hole pattern 76,78,80,82 in the main side wall 84,86 commensurate with the second set of through holes 430 of the associated fastening element 400. Further, the cross member 62 is fastened to the frame side members 4,5 via fasteners in each one of the commensurate holes in the hole pattern 76,78,80,82 and the second set of through holes 430 of the fastening elements 400.

Figure 7A:
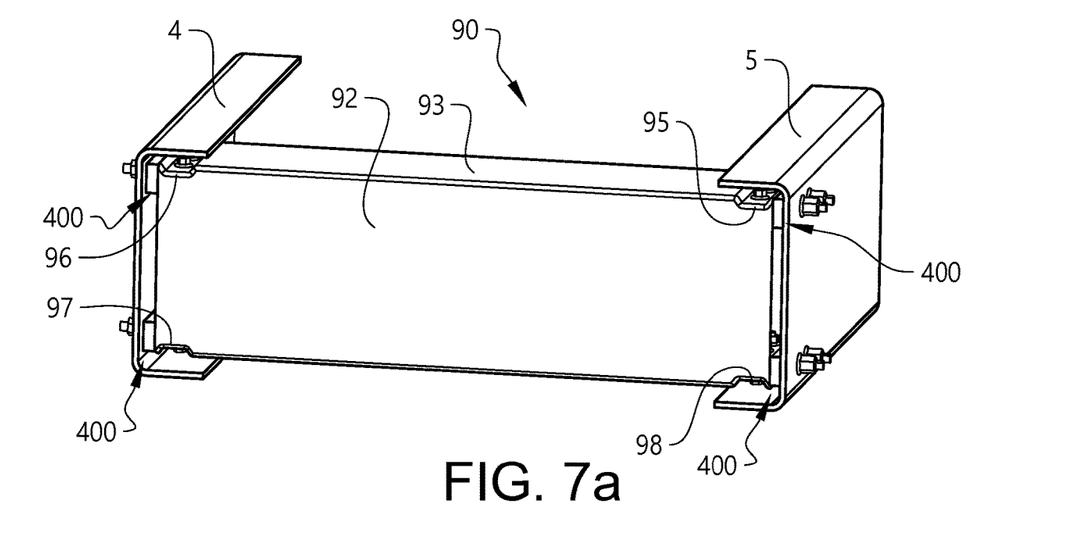
FIGS. 7a and 7b show a chassis arrangement according to a fifth embodiment in perspective views from opposite sides.
Figure 7B:
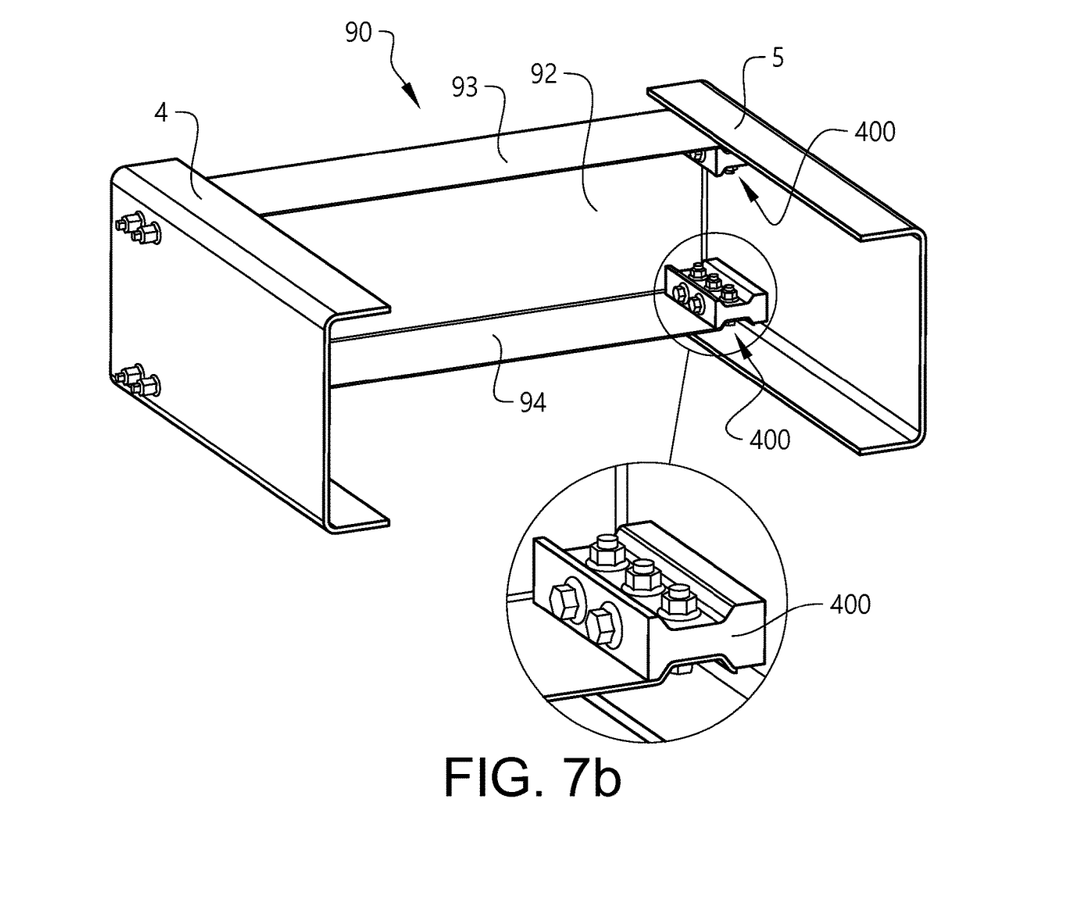

FIGS. 7a and 7b show a chassis arrangement 90 according to a fifth embodiment in perspective views from above from opposite sides. The fifth embodiment is a variant of the fourth embodiment. For ease of presentation, only the main differences will be described below. The cross member 92 comprises an upper elongated plate-shaped member 93 and a lower elongated plate-shaped member 94, which are arranged in parallel with each other, in a spaced relationship and in parallel with a longitudinal direction of the cross member 92. Each end of the upper elongated plate-shaped member 94 comprises a complimentary shaped engagement portion 95, 96. Each one of the complimentary shaped engagement portion 95, 96 comprises an elongated projection with a longitudinal direction perpendicular to a longitudinal direction of the cross member 92. Both projections 95,96 faces downwards. In a similar manner, each end of the lower elongated plate-shaped member 94 comprises a complimentary shaped engagement portion 97,98. Each one of the complimentary shaped engagement portions 97,98 comprises an elongated projection with a longitudinal direction perpendicular to a longitudinal direction of the cross member 92. Both projections 97,98 face upwards.

Figure 8:
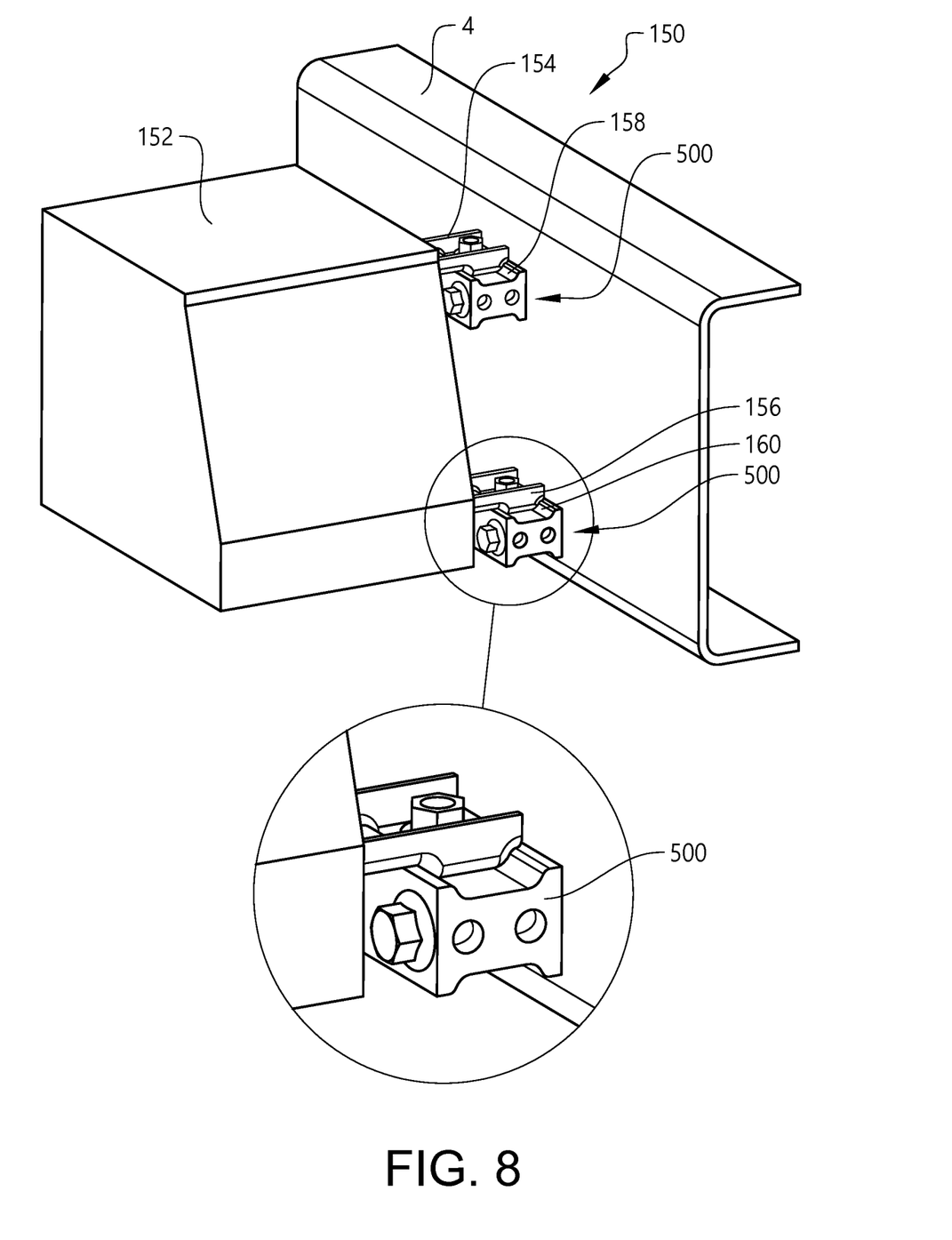
FIG. 8 shows a chassis arrangement according to a sixth embodiment in perspective view from above.

FIG. 8 shows a chassis arrangement 150 according to a sixth embodiment in a perspective view from above. The chassis arrangement 150 comprises one of said frame side members 4 and a component 152, which is attached to an external side of the frame side member 4 via two fastening elements 500 according to the fifth embodiment. More specifically, the component 152 comprises two elongated brackets 154,156 extending in a spaced, parallel relationship. Each one of the elongated brackets 154,156 comprises a complimentary shaped engagement portion 158,160 in the form of a projection for engagement with a first engagement portion 504 in the form of a recess of the associated fastening element 500. Further, both projections 158,160 face downwards, wherein the fastening elements 500 are arranged so that an upper side of each one is in engagement with the associated elongated bracket. Further, each one of the elongated brackets 154,156 is fastened to the associated fastening element 500 via fasteners in a way similar to what has been described above and the fastening element 500 is fastened to the frame side member 4 via fasteners in a way similar to what has been described above.

Figure 9A:
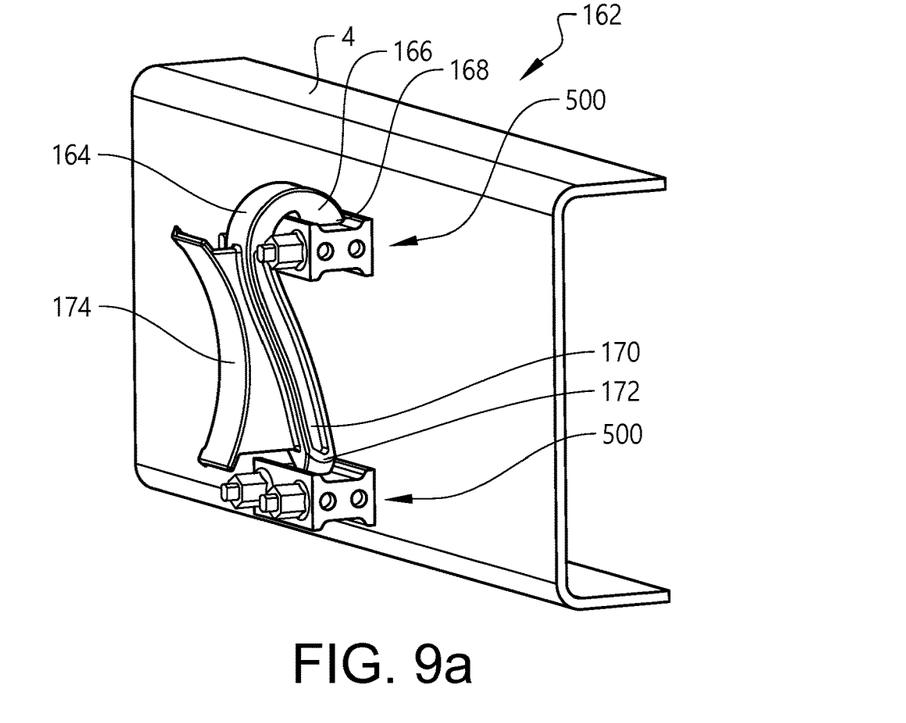
FIG. 9a shows a chassis arrangement according to a seventh embodiment in a perspective view from above.
Figure 9B:
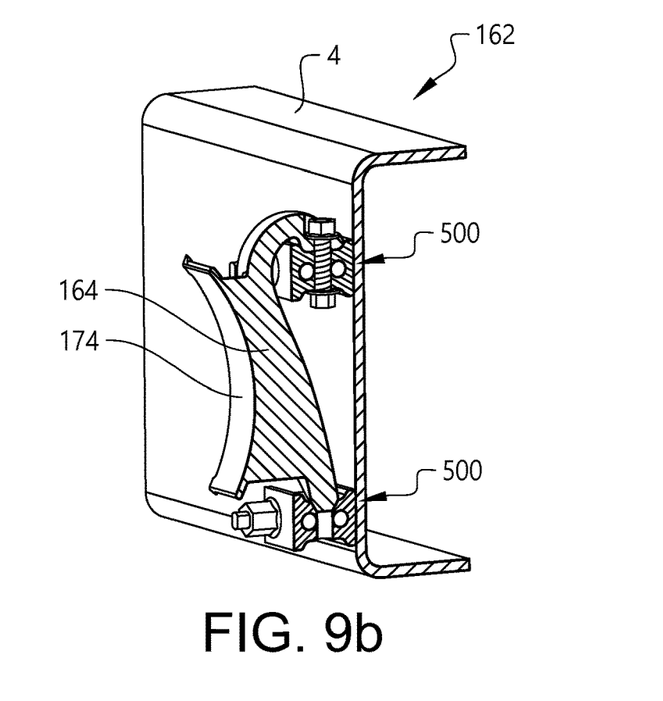
FIG. 9b shows the chassis arrangement according to FIG. 9a in a partly cut view.

FIG. 9a shows a chassis arrangement 162 according to a seventh embodiment in a perspective view from above. FIG. 9b shows the chassis arrangement 162 according to FIG. 9a in a partly cut view. The seventh embodiment is a variant of the sixth embodiment. For ease of presentation, only the main differences will be described below. The chassis arrangement 162 comprises a single bracket 164, which engages two fastener elements 500, which are fastened to the side frame member 4 on top of each other in a spaced relationship. The bracket 164 has the shape of a hook, wherein a first end 166 of the hook comprises a complimentary shaped engagement portion 168 in the form of a projection for engagement with a first engagement portion 504 in the form of a recess on an upper side of the upper fastening element 500. A second end 170 of the hook comprises a complimentary shaped engagement portion 172 in the form of a projection for engagement with a first engagement portion 504 in the form of a recess on an upper side of the lower fastening element 500. Further, the bracket 164 comprises an abutment surface 174 facing away from the frame side member 4. The abutment surface 174 has a curved shape and extends over a main portion of the hook in a direction between the first and second ends. Further, the bracket 164 is fastened to the associated fastening element 500 via fasteners in a way similar to what has been described above and the fastening element 500 is fastened to the frame side member 4 via fasteners in a way similar to what has been described above.

Figure 10:
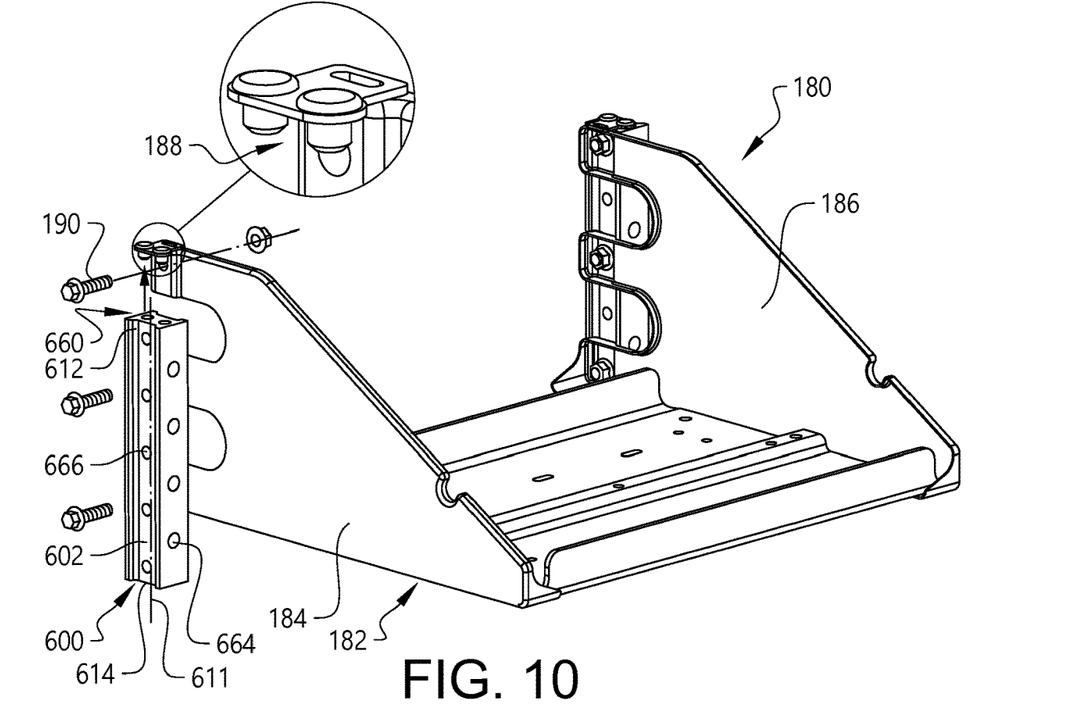
FIGS. 10 and 11 show a chassis arrangement according to an eighth embodiment in two perspective, exploded views from opposite sides.

FIG. 10 shows a chassis arrangement 180 according to an eighth embodiment in a perspective, exploded view from above. The eighth embodiment is a variant of the first embodiment. The chassis arrangement 180 comprises a fastening element 600 according to a sixth embodiment, which is a variant of the first embodiment. More specifically, the fastening element 600 according to the sixth embodiment differs from the fastening element 100 according to the first embodiment in that the fastening element 600 comprises a third set of holes 660, which extend in parallel with the longitudinal direction 611 of the body 602. The holes 660 in the third set are open at least at a first end 612 of the body 602. The first end 612 of the body 602 being further adapted to face upwards when applied to the frame side member. In the shown example, the holes 660 are through holes, wherein they are also open at a second end 614 of the body 602.

The chassis arrangement 180 further comprises a first component 182 in the form of a bracket structure, which is a variant of the bracket structure 6 according to the first embodiment. The bracket structure 182 comprises two side walls 184,186. Each one of the side walls 184,186 comprises a set of projections 188 in the form of locating pins, which are rigidly connected to the respective side wall 184,186 and arranged for matching and being received in the holes 660 in the third set. Thus, the bracket structure 182 may be hanged onto the fastening element 600 via the projections 188 being received in the holes 660. Consequently, during assembly, the fastening elements may first be attached to the frame side member via first fasteners (not shown) in the second set of through holes 664 and then, in a second step, the bracket structure 182 is hanged onto the fastening element 600 and then, in a third step, the bracket structure 182 is fastened to the fastening element 600 via further fasteners 190 in the first set of through holes 666. In this way, assembly of the chassis arrangement may be simplified and more time-efficient in that the operator may hang the bracket structure before tightening the fasteners.

Figure 11:
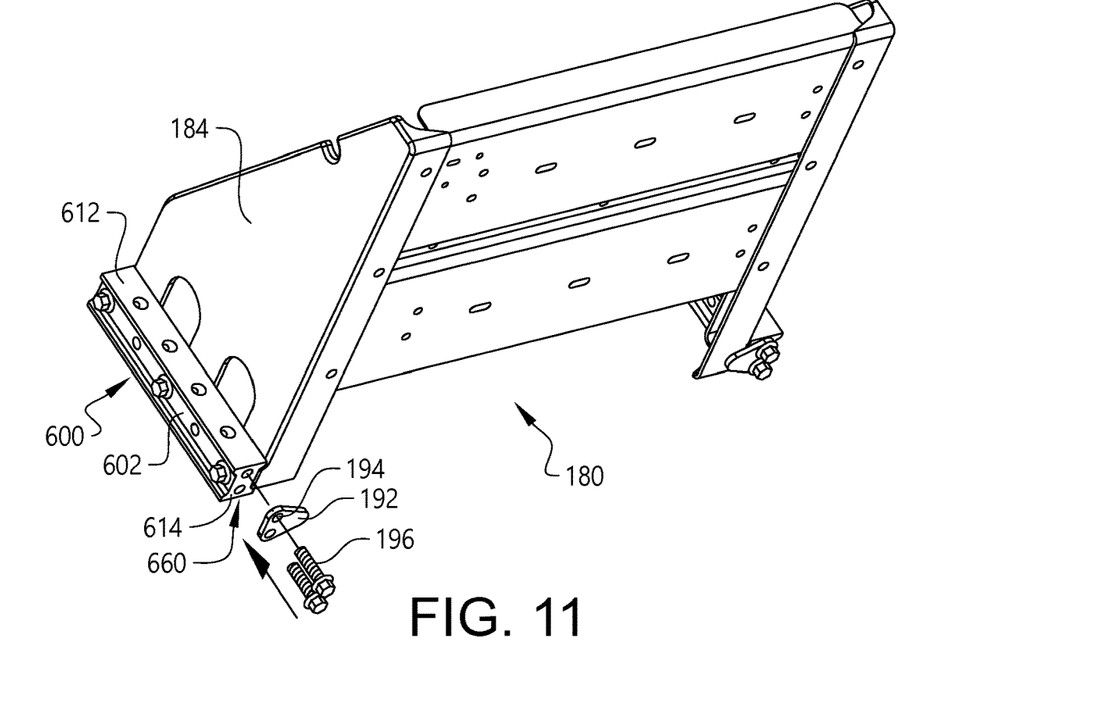

FIG. 11 shows the chassis arrangement 150 according to the eighth embodiment in a perspective, exploded view from below. The bracket structure comprises a stopper 192 in the form of a plate, which comprises a hole pattern 194 commensurate with the third set of through holes 660 for attaching the stopper 192 below the fastening element 600 via fasteners 196 in a way that the stopper 192 overlaps with the side wall 184 in the longitudinal direction of the fastening element 600. The hang feature in FIG. 10 may be used without the stopper 192 in FIG. 11 and vice versa.

It is to be understood that the present invention is not limited to the embodiments described above and illustrated in the drawings; rather, the skilled person will recognize that many changes and modifications may be made within the scope of the appended claims.

For example, the fastening element may be provided with one or several engagement portions in the form of one or several projections and the associated component(s) may be provided with one or several complimentary shaped engagement portions in the form of recesses. According to a further alternative, a fastening element may be provided with a first engagement portion in the form of a recess and a second engagement portion in the form of a projection.

The invention claimed is:

1. A vehicle comprising:
a chassis arrangement that comprises:
two elongated and parallel frame side members; and
a first vehicle chassis component fastened to at least one of the frame side members via at least one fastening element;
wherein the fastening element comprises a body, which comprises a first engagement portion on a first side, wherein the first engagement portion comprises either a recess or a projection mating with a complementary shaped engagement portion arranged on the first vehicle chassis component, wherein the body further comprises a first set of through holes for receipt of fasteners, wherein the first set of through holes are positioned in such a way that the first engagement portion of the body and the complementary shaped engagement portion of the first vehicle chassis component may be held against each other in an engaged state via the fasteners,
wherein the first set of through holes extend between the first side of the body and a second side of the body opposite the first side,
wherein the fastening element comprises a second set of through holes for receipt of fasteners for fastening the fastening element to the frame side member,
wherein the second set of through holes extends between a third side and a fourth side of the body, and
wherein at least one of the third side and the fourth side of the body comprises a planar surface.

2. The vehicle according to claim 1, wherein the first engagement portion has an elongated shape.

3. The vehicle according to claim 2, wherein the first engagement portion has the same cross sectional shape in spaced positions along a longitudinal direction of the first engagement portion.

4. The vehicle according to claim 1, wherein the first engagement portion extends the complete distance between opposite ends of the body.

5. The vehicle according to claim 1, wherein the first engagement portion comprises a recess.

6. The vehicle according to claim 1, wherein the first engagement portion comprises a flat surface.

7. The vehicle according to claim 1, wherein at least one through hole of the first set of through holes extend through the first engagement portion on the first side of the body.

8. The vehicle according to claim 1, wherein the holes in the first set of through holes are arranged in parallel with each other and spaced from each other in a first direction.

9. The vehicle according to claim 1, wherein the body comprises a second engagement portion on a second side opposite the first side, wherein the second engagement portion comprises either a recess or a projection.

10. The vehicle, according to claim 9, wherein the second engagement portion has an elongated shape.

11. The vehicle according to claim 10, wherein the second engagement portion has the same cross sectional shape in spaced positions along a longitudinal direction of the second engagement portion.

12. The vehicle according to claim 11, wherein the second engagement portion has the same cross sectional shape as the first engagement portion.

13. The vehicle according to claim 10, wherein the second engagement portion extends in parallel with the first engagement portion.

14. The vehicle according to claim 9, wherein the second engagement portion comprises a recess.

15. The vehicle according to claim 1, wherein the chassis arrangement comprises a frame cross member, wherein the first vehicle chassis component is formed by said frame cross member.

* * * * *